United States Patent
Forssell et al.

(10) Patent No.: US 6,714,784 B1
(45) Date of Patent: Mar. 30, 2004

(54) METHOD AND ARRANGEMENT FOR PROVIDING FAST CELL CHANGE IN A PACKET-SWITCHED CELLULAR RADIO SYSTEM

(75) Inventors: Mika Forssell, Espoo (FI); Janne Parantainen, Helsinki (FI); Shkumbin Hamiti, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 397 days.

(21) Appl. No.: 09/591,628

(22) Filed: Jun. 9, 2000

(30) Foreign Application Priority Data

Jun. 10, 1999 (FI) ................................................... 991333

(51) Int. Cl.[7] ............................................... H04Q 7/20
(52) U.S. Cl. ....................... 455/436; 455/439; 370/331
(58) Field of Search ............................... 455/436, 439, 455/440, 441, 442, 445; 370/355, 356, 360, 331, 218

(56) References Cited

U.S. PATENT DOCUMENTS

| | | | |
|---|---|---|---|
| 5,146,609 A | * 9/1992 | Tayloe et al. | 455/436 |
| 5,408,517 A | * 4/1995 | Nyhart et al. | 455/438 |
| 5,530,693 A | 6/1996 | Averbuch et al. | 370/60 |
| 5,682,416 A | * 10/1997 | Schmidt et al. | 455/436 |
| 6,035,199 A | * 3/2000 | Barnett | 455/448 |
| 6,128,287 A | * 10/2000 | Freeburg et al. | 370/331 |
| 6,138,020 A | * 10/2000 | Galyas et al. | 455/436 |
| 6,424,638 B1 | * 7/2002 | Ray et al. | 370/331 |

FOREIGN PATENT DOCUMENTS

| | | |
|---|---|---|
| EP | 0174419 | 3/1986 |
| EP | 0369535 | 5/1990 |
| EP | 0439630 | 8/1991 |
| EP | 0893931 | 1/1999 |

\* cited by examiner

Primary Examiner—Edward F. Urban
Assistant Examiner—Simon Nguyen
(74) Attorney, Agent, or Firm—Perman & Green, LLP

(57) ABSTRACT

A method is presented for implementing a cell change for a mobile station (MS) in a packet-switched cellular radio system comprising a first base station (BTSold), a second base station (BTSnew) and a controlling unit (PCU, PCUold) controlling the operation of at least the first base station (BTSold). The method comprises the steps of establishing at the controlling unit (PCU, PCUold) the knowledge about the mobile station's (MS) need for performing a cell change from the cell of the first base station (BTSold) to the cell of the second base station BTSnew) while the mobile station (MS) is still communicating with the first base station (BTSold), transmitting from the controlling unit (PCU, PCUold) towards the mobile station through the first base station (BTSold) a first message (207, 309, 410) in order to fix an oncoming first moment of lime (209) as the moment of performing cell change and from said first moment of time onwards (209) providing access for the mobile station to the cell of the second base station.

20 Claims, 4 Drawing Sheets

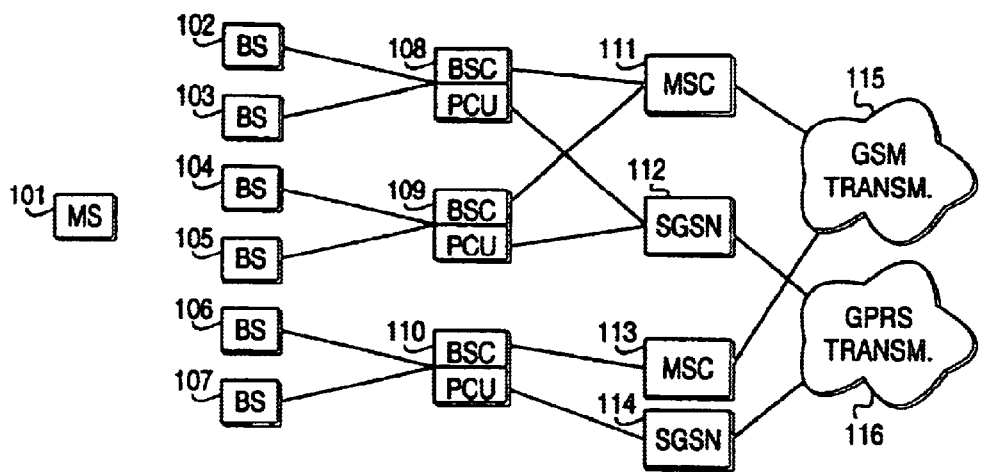
Fig. 1
PRIOR ART
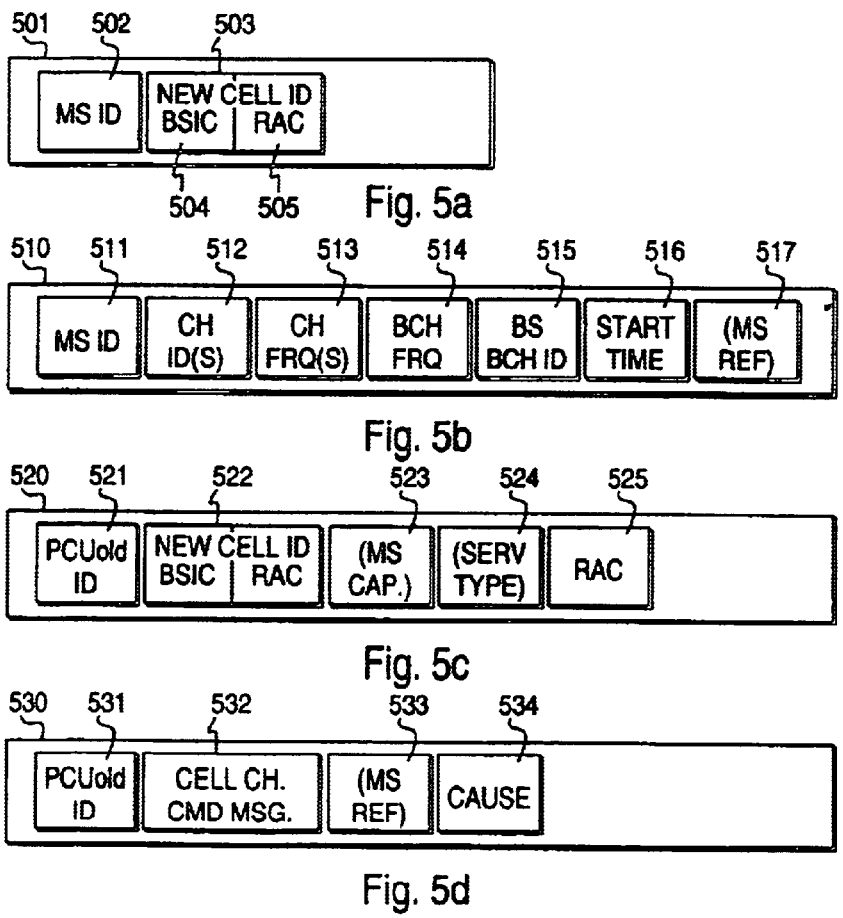

METHOD AND ARRANGEMENT FOR PROVIDING FAST CELL CHANGE IN A PACKET-SWITCHED CELLULAR RADIO SYSTEM

TECHNOLOGICAL FIELD

The invention relates in general to the technological field of packet-switched cellular radio systems. More precisely the invention relates to the cell change procedures, i.e. the procedures for rerouting an active packet-switched communication connection between a mobile station and a fixed packet-switched network through a new base station. An important application framework for the invention is the GPRS or General Packet Radio Service system which is undergoing specification at the priority date of the present patent application. Other at least equally important application frameworks are the UMTS (Universal Mobile Telecommunication System) where the so-called connectionless data services are packet-switched, and the EDGE (Enhanced Data rates for GSM evolution) where also connectionless data services will be implemented.

BACKGROUND OF THE INVENTION

The services that are offered over telecommunication connections may be broadly categorized into real time and non-real time services. The former class covers such services where an essentially continuous or at least piecewise continuous stream of information is carried from the transmitter to the receiver and the intelligibility of the received information depends on the continuity: only relatively small and relatively constant delays are allowed. Typical real time services involve the transmission of speech and (moving) images like in a telephone or videophone connection, where e.g. a voice activity detection system may be used to provide piecewise continuity, i.e. to periodically halt the transmission when there is nothing important to transmit. Non-real time services cover the transmission of information with less critical timing requirements and are typically referred to as transmission of data. Electronic mail and downloading of files from or to a distant location are examples of non-real time service applications.

Packet-switched cellular radio systems have usually been designed to complement the known circuit-switched mobile telephone systems and their future successors so that the division of work would involve the use of circuit-switched systems to provide real time services and packet-switched systems to provide non-real time services. Circuit- and packet-switched transmission may even be implemented as alternative operational modes within the framework of a single telecommunication systems, or in hybrid network arrangements where the same base stations and other radio access hardware are used for both systems but the other fixed network devices and communication connections between them are separate. An arrangement of the last mentioned type is the combination of a GSM mobile telephone network (Global System for Mobile telecommunications) and the GPRS network.

FIG. 1 illustrates a combined GSM/GPRS arrangement where an MS or mobile station 101 may choose one of the BSs or base stations 102 to 107 to communicate with. Base stations 102 and 103 operate under a controlling device 108 where a PCU or packet control unit is combined to a BSC or base station controller. Similarly base stations 104 and 105 operate under controlling device 109 and base stations 106 and 107 operate under controlling device 110. From this level upwards the GSM arid GPRS networks have different architectures. Each base station controller is coupled to a MSC or a mobile switching centre and these are in turn interconnected through a GSM transmission network 115. Each packet control unit is coupled to a SGSN or serving GPRS support node and these are in turn interconnected through a GPRS transmission network 116, where the connections go through GGSNs or gateway GPRS support nodes (not shown). The small number of devices shown in FIG. 1 is for graphical clarity only: in realistic GSM/GPRS systems there are typically thousands of base stations, hundreds of BSC/PCUs and dozens of MSCs and SGSNs.

It should be noted that the location of a PCU is not defined very strictly in the known GPRS: in addition to the arrangement shown in FIG. 1 a PCU may be located in a base station or in an SGSN. The present invention does not have any particular biasing towards any most advantageous location of the PCU. The general network architecture and the interconnections of the base stations, PCUs and SGSNs naturally depend on the location of the SGSN.

Around each base station there is a cell or radio coverage area within which a mobile station may communicate with that base station. When a mobile station moves out of one cell and into another, a cell reselection, a handover or a cell change must be performed. Cell reselection takes place when the mobile station is in idle mode and no communication connections are currently active between it and the fixed parts of the network. A handover means that an active circuit-switched communication connection must be rerouted through a new base station. A cell change means that an active packet-switched communication connection must be rerouted through a new base station. Regarding packet-switched (GPRS) communications in an arrangement according to FIG. 1 the cell reselection or cell change may be intra-PCU (for example from base station 102 to base station 103), inter-PCU but intra-SGSN (for example from base station 103 to base station 104) or inter-PCU and inter-SGSN (for example from base station 105 to base station Although the GPRS system like many other packet-switched cellular radio systems has been designed primarily for providing non-real time services, there is a tendency towards using it also to provide some real time services, of which the Internet calls are a good example. An Internet call is a telephone connection routed through the Internet instead of the common telephone networks. It may be accompanied with a video part. Also other applications requiring real time services through a packets switched cellular radio network are known.

A problem of the known GPRS that also appears in many other packet-switched cellular radio systems is that the cell change procedures have been opimized for simplicity rather than short delay. According to the standardized GPRS procedure the exchange of packet data between a mobile station and the old base station is first terminated, after that a new cell is chosen and only thereafter the transfer of packets is resumed through the base station of the new cell. The procedure works well for non-real time services since the delay between terminating the old connection and establishing the new one does not matter. However, the length of the delay is easily several hundreds of milliseconds or even up to some seconds, which is definitely too much for a real time service where such a long delay is at least annoying and may even cause the call or other connection to be dropped if the delay is interpreted as a severe breakdown in the flow of information. The long delay may also cause frustration to the users of non-real time services even when it does not actually affect the intelligibility of the transmitted information: for example the downloading of web pages is unnecessarily slowed down by the delays.

SUMMARY OF THE INVENTION

It is an object of the present invention to provide a method and an arrangement for performing a cell change in a packet-switched cellular radio network with a delay that is short enough to be acceptable for real time services and to avoid unnecessary retardation for non-real time services.

The objects of the invention are achieved by commencing the cell change before terminating the old connection and preferably also using a countdown timer to trigger the switchover from the old cell to the new cell.

The method of the invention is designed for implementing a cell change for a mobile station in a packet-switched cellular radio system comprising a first base station, a second base station and a controlling unit controlling the operation of at least the first base station. It comprises as its characteristic features the steps of establishing at the controlling unit the knowledge about the mobile station's need for performing a cell change from the cell of the first base station to the cell of the second base station while the mobile station is still communicating with the first base station, transmitting from the controlling unit towards the mobile station through the first base station a first message in order to fix an oncoming first moment of time as the moment of performing cell change and from said first moment of time onwards providing access for the mobile station to the cell of the second base station.

Additionally the invention applies to a method for implementing a cell change in a mobile station of a packet-switched cellular radio system This aspect of the invention comprises as its characteristic features the steps of receiving a message from a controlling unit of the packet-switched cellular radio system through a first base station, after the reception of said message, continuing the utilization of an existing packet-switched communication connection with the first base station until a certain first moment of time defined in said message as that moment of performing cell change and from said first moment of time onwards accessing the cell of a second base station.

The invention also applies to an arrangement for implementing a cell change for a mobile station in a packet-switched cellular radio system comprising a first base station, a second base station and a controlling unit for controlling the operation of at least the first base station. The arrangement comprises as its characteristic features in the controlling unit means for establishing at the controlling unit the knowledge about the mobile station's need for performing a cell change from the cell of the first base station to the cell of the second base station while the mobile station is still communicating with the first base station, in the controlling unit and the first base station means for transmitting towards the mobile station through the first base station a first message in order to fix an oncoming first moment of time as the moment of performing cell change and in the second base station means for from said first moment of time onwards providing access for the mobile station to the cell of the second base station.

The fact that a cell change may be initiated either by the mobile station or by the network is known as such. According to the invention the initiation of cell change does not have the immediate effect of terminating the packet-switched transmission of data between the mobile station and the old base station. Instead, the allocation of resources from the new base station is commenced while the old connection is still active. A cell change command message is transmitted to the mobile station. This message causes the mobile station to start a countdown timer the expiry of which corresponds to the exact estimated moment for changing cells.

The cell change command message may also comprise a reference or temporary identifier switch the mobile station may use when it accesses the new base station. This is a particularly simple way of ensuring that the mobile station to which the newly allocated resources are given from the new base station actually is the one for which the cell change was requested. Also the obligatorily defined moment of time when the mobile station must access the new base station may be communicated to both the mobile station and the new base station.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 illustrates a known network architecture,

FIG. 4 illustrates a method according to a third embodiment of the invention and FIGS. 5a to 5f illustrate certain messages to be used in association with the invention.

DETAILED DESCRIPTION OF THE INVENTION

The most common reason behind the initiation of a cell change is that the received signal strength between the mobile station and a new base station appears to be considerably higher than that between the mobile station and the old base station, The new cell may also belong to a home area or some other group of preferred cells, in which case it is advantageous to change cell even when the signal strength criterion is not fulfilled. The network may even command some mobile stations to change cell for some administrative reasons like evening out traffic congestion. The actual initiation for cell change may come either from the mobile station or from the network. The present invention is equally applicable regardless of where did the initiation for cell change come from and what was the reason behind it. Naturally the limitations imposed through network specifications must be obeyed: for example in some cases the network may not allow the mobile stations themselves to initiate cell changes.

Figure 2:
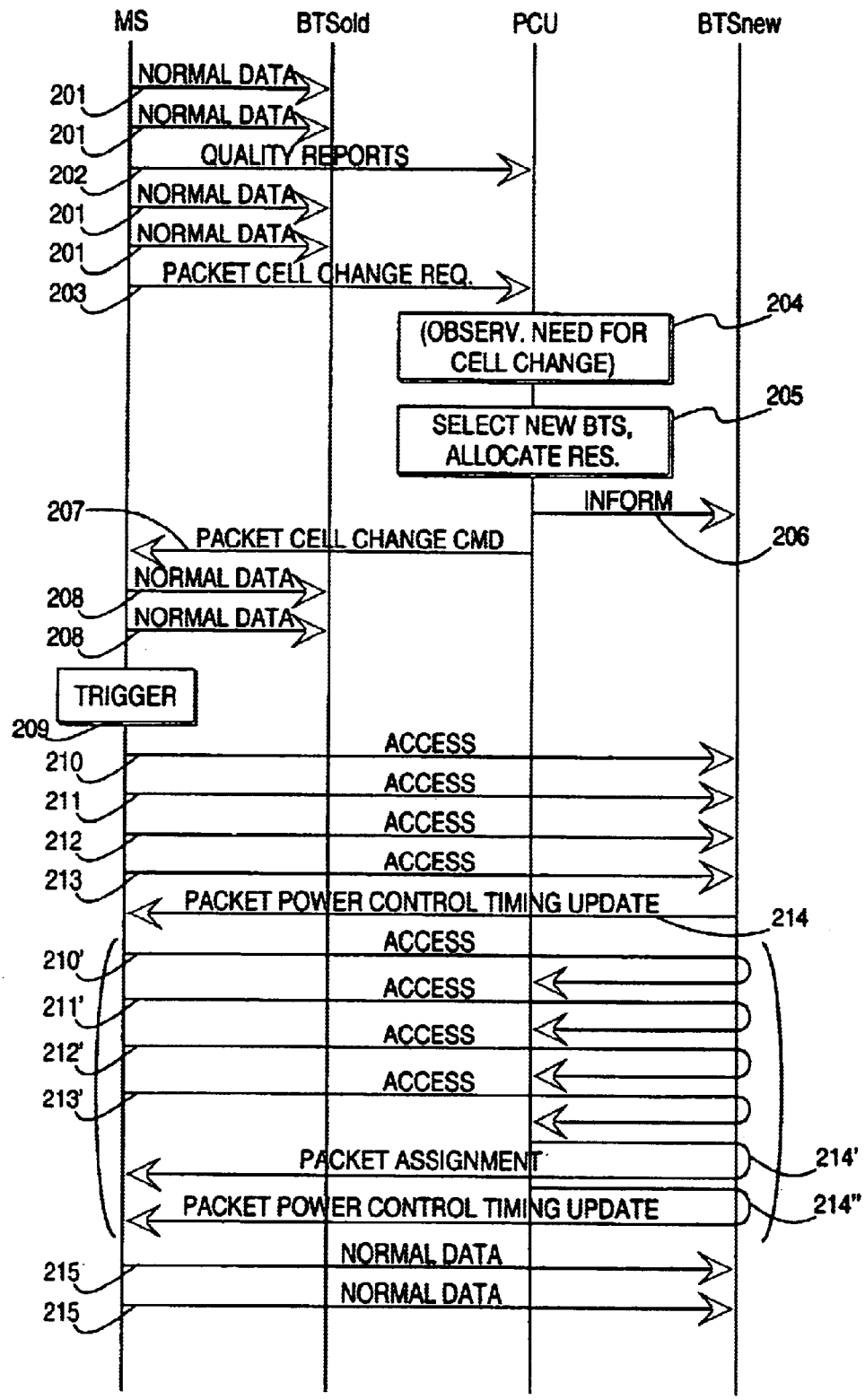
FIG. 2 illustrates a method according to a first embodiment of the invention.

FIG. 2 illustrates the flow of messages and some other transmissions in a method according to a first embodiment of the invention, more exactly the embodiment concerning an intra-PCU cell change. Arrows 201 illustrate the normal transmission of data packets between the mobile station and the old base station, and arrow 202 illustrates the periodic transmission of quality reports from the mobile station to the PCU. Here in FIG. 2 it is assumed that all mobile stations regularly transmit to the PCU quality reports that indicate the observed connection quality between the mobile station and the old base station as well as the estimated connection quality between the mobile station and at least one candidate for new base station (taken that the mobile station is able to receive the transmissions of at least one such candidate base station). The invention does not require such quality reports to be sent, and if they are sent, the invention does not require them to be sent regularly.

Arrow 203 represents the optional step of the mobile station sending to the PCU a PACKET_CELL_CHANGE_REQUEST message, preferably on a certain dedicated channel like the known PACCH (Packet Associated Control CHannel) or a similar signalling channel. In some other present or future packet-switched cellular radio systems the cell change request may be sent also through a packet access channel which is not dedicated but a common, shared control channel. The optionality of this step means that it is only executed if the mobile station itself initiates the cell change. FIG. 5a is a schematic representation of such a request message 501 showing that it should contain at least a mobile station identifier 502 and the identifier 503 of the suggested new cell. The latter may consist for example of a BSIC or base station identifier code 504 and an RAC or routing area code 505. It may also comprise a list of such identifiers for a number of candidate cells. The alternative for arrow 203 in FIG. 2 is the observation at the PCU itself that a cell change is needed for a certain mobile station; this alternative step of action is shown in FIG. 2 by block 204.

Regardless of which of steps 203 and 204 was executed the PCU makes a decision about whether or not a cell change is acceptable. In case of a negative decision to a mobile-requested cell change it transmits to the mobile station a denial message, which is not shown in FIG. 2. In case of a negative decision to a cell change which it initiated by itself the PCU simply does not proceed any further. The positive alternative means that the PCU accepts the cell change and initiates the allocation of radio resources from the new base station. If the cell change was initiated by a request message from the mobile station the new base station may be the one indicated in the request message or one from the list of candidate cells indicated in the request message. If the PCU initiated the cell change by itself it selects the new base station e.g. on the basis of the information it has previously received in the quality reports from the mobile station.

When the packet-switched communication connection which is the subject of the cell change is known to be used for providing real time services, it is particularly advantageous if the radio resources from the new base station can be allocated from a pool of radio resources dedicated to GPRS use. Depending on the implementation, the current traffic loading situation and the amount of available resources it may happen that the new base station either has no such pool of dedicated GPRS resources at all or does not have any of them free for allocation, in which case the resources for the new allocation must be taken from those that are also allocatable for GSM. This has the disadvantage that the GSM system may suddenly "steal" such resources despite their previous allocation to GPRS, since the circuit-switched GSM connections usually have service precedence over the GPRS connections which are assumed to carry non-real time services. If the PCU is in the process of making an allocation decision and the quality report(s) and/or the request message from the mobile station indicate that there are actually several potential candidates for the new base station, it may even base its final selection on the fact that one of the suggested new base stations has a superior amount of allocatable dedicated GPRS radio resources available.

We might ask, how does the PCU know that a certain packet-switched communication connection that is currently subject to cell change is used to carry real time services. Actually the invention does not require the PCU to know it at all. If it is seen to be advantageous, there may be defined a number of ways of indicating the use of a packet-switched connection to provide real time services, and the present invention is not limiting in that sense, i.e. it does not require a certain method to be used. While the present invention does not even require that the PCU should be aware of the real time or non-real time use of the connections, it may be advantageous if it is able to provide certain priviledges (like the above-mentioned preferred allocation of dedicated GPRS resources) to those connections that are actually used to provide real time services.

In FIG. 2 block 205 represents tie selection of new base station and allocation of its resources at the PCU.

After step 205 the PCU must command the mobile station to perform the cell change. In GPRS the new base station need not be informed about the cell change in any way, but for the sake of completeness we may assume that in some other systems informing the new base station may take the form of network signalling known as such; this is shown by arrow 206 in FIG. 2. If the allocation decision comprised a full amount of radio resources for the connection subject to cell change and if the network implements a so-called early timing advance sending option, the PCU defines that a particular mobile station will access the new cell in a certain block period in the near future; we may designate this block period by BP X. Additionally, taken the conditions mentioned above, the PCU reserves a downlink block period from the new base station so that the new base station may answer a mobile station performing access on a certain dedicated resource by sending the correct timing advance value. We will address the early timing advance sending option in more detail at a later section of this description.

The step of commanding the mobile station to perform the cell change is seen in FIG. 2 as the transmission of a PACKET_CELL_CHANGE_CMD message 207. A schematic representation of a number of fields contained in the message, referred to as 510, is shown in FIG. 5b. The fields comprise a mobile station identifier 511, channel identifier(s) 512, channel frequency indicator(s) 513, broadcast channel (BCH) frequency indicator 514, base station identification code to be broadcast on the broadcast channel 515, starting time indicator 516 and an optional mobile station reference 517. The message is sent to the mobile station on a certain signalling channel, e.g. the known packet access grant channel or PAGCH.

The above-mentioned fields in the cell change command message are self-explanatory except the starting time indicator 516. To enable a rapid cell change at a controlled moment the PCU preferably does not command the mobile station to perform the cell change immediately at the reception of the cell change command message, bit defines the moment for cell change execution so that the mobile station (and potentially also the new base station) will have enough time to prepare for it. The moment for actual cell change execution may be defined either by reference to a timer or real time clock (a certain fixed time reading of a real time clock, or a certain period of time defined as the expiry of a countdown timer immediately after receiving the message), or by reference to a certain frame number and block period: the transmission frames at the radio interface between the mobile station and the base stations are individually numbered so a frame number may be used as an indication of time, and a block period number may be used to identify a block period within the transmission frames. The starting time indicator field 516 in the cell chance command message contains the information on the basis of which the mobile station is able to calculate the moment for actual cell change execution: a real time clock reading, a timer initialization value, a frame number or block period countdown value or a fixed frame number and a block period number.

The starting time indicator field may also contain a value indicating immediate commencing of the cell change, or it may even be missing which the mobile station interprets as a command for commencing the cell change immediately or after a certain fixed delay laid down in the system specifications.

In FIG. 2 it is seen that the normal transmission of data packets between the mobile station and the old base station continue for a while, indicated by arrows 208, after the mobile station has received the cell change command message. This is the time before the cell change execution timer expires. The triggering of the actual cell change is shown in FIG. 2 as block 209. Immediately thereafter the mobile station starts accessing the new cell.

For an access to a new cell to be successful it is advantageous that the mobile station transmits not a single access burst but a number of successive access bursts in the blocks period indicated by the channel identifier(s) field 512 and channel frequency indicator(s) 513 field of the cell change command message (although the invention does not rule out the transmission of only a single access burst). These access bursts are seen in FIG. 2 as arrows 210 to 213. Above it was mentioned that the cell change command message may contain a mobile station reference: if that was the case, the mobile station may insert its reference to at least one access burst. The idea is that because the network is aware of the mobile station reference, it may check its appearance in the access burst(s) to ensure that the mobile station attempting access is the correct one.

From the reception at the new base station of one or more access bursts 210 to 213 from the mobile station the operation according to the first embodiment of the invention differs depending on whether or not the network implements the early timing advance sending option known as such. Timing advance in general means that the propagation delay resulting from the physical distance between the mobile station and the base station is compensated for by advancing each uplink emission at the mobile station by a certain time interval the length of which must be signalled from the base station to the mobile station. Calculating the timing advance and signalling it to a mobile station is known as such from e.g. the known handover procedures of the GSM system. In short, early timing advance sending means that immediately after having received the access burst(s) from the mobile station the new base station sends the value of the timing advance parameter to the mobile station, whereafter the actual transmission of data may commence. If this option is not implemented, a separate allocation for the transmission of the timing advance parameter is needed, to which end the access burst(s) are not terminated at the new base station but forwarded to the PCU.

In the main part of FIG. 2 we have assumed that the early timing advance sending option is implemented, which also means that the PCU must have previously futureallocated a certain piece of dedicated downlink capacity from the new base station for sending the timing advance value to the mobile station, as mentioned earlier. Correspondingly the new base station transmits in FIG. 2 the PACKET_POWER_CONTROL_TIMING_UPDATE message 214 to the mobile station. The message is sent most advantageously on the downlink part of the same channel the uplink part of which was used by the mobile station to transmit the access bursts. The transmission instant of the message may be defined to be N block periods or BPs after the BP which the mobile station used to transmit the access bursts, where N is a constant positive integer to be defined in the system specifications. The allocation of the corresponding downlink BP to the exclusive use of the connection carrying a real time service is most advantageously kept valid by the PCU, i.e. the PCU will not allocate it to any other connections.

The above-described method also assumes that the allocation of radio resources from the new base station already comprised the allocation of a "full" radio channel or enough resources to conduct the transmission of data in the connection which was the subject of the cell change without remarkable change to the conditions in the old cell. The part of FIG. 2 in parentheses shows an alternative course of action which applies to networks where the early timing advance sending option is not implemented or to situations where the mobile station was first allocated only a limited amount of radio resources to perform the initial access to the new cell. In this case the access burst(s) 210' (to 213') are forwarded to the PCU so that it may assign the timing advance to the mobile station and the necessary further resource allocations can be made. The PCU allocates full or new radio resources and signals the new allocations (if any) downwards to the mobile station e.g. with a PACKET_ASSIGNMENT message 214'. For assigning the timing advance parameter e.g. a PACKET_POWER_CONTROL_TIMING_UPDATE message 214" can be used, but the invention does not require any particular messages to be used.

Upon receipt of the PACKET_ASSIGNMENT message 214 or a PACKET_POWER_CONTROL_TIMING_UPDATE message, be it with or without early timing advance sending, the mobile station starts monitoring the assigned downlink channel(s) and it may also use the assigned uplink channels for sending uplink bursts to the network. This is illustrated in FIG. 2 by arrows 215. The first uplink Protocol Data Unit or PDU which belongs to the LLC (Logical Link Control) protocol layer and reaches the SGSN (not shown in FIG. 2) to which the PCU is coupled causes the new location of the mobile station to be updated in the mobility records held by the SGSN. If the access to the new cell fails, the first alternative is that the mobile station may return to the old cell (where radio resource allocations for it are still valid at this stage) to continue the transmission of data. The cell change procedure may then be re-initialized.

Taken that FIG. 2 illustrates an intra-PCU cell change it is on the responsibility of the PCU that controls the both base stations to release the resource allocations in the old cell after a successful cell change. The releasing may take place at any time after the CPU has noticed that bursts related to normal transmission of data are flowing through the new base station.

Figure 3:
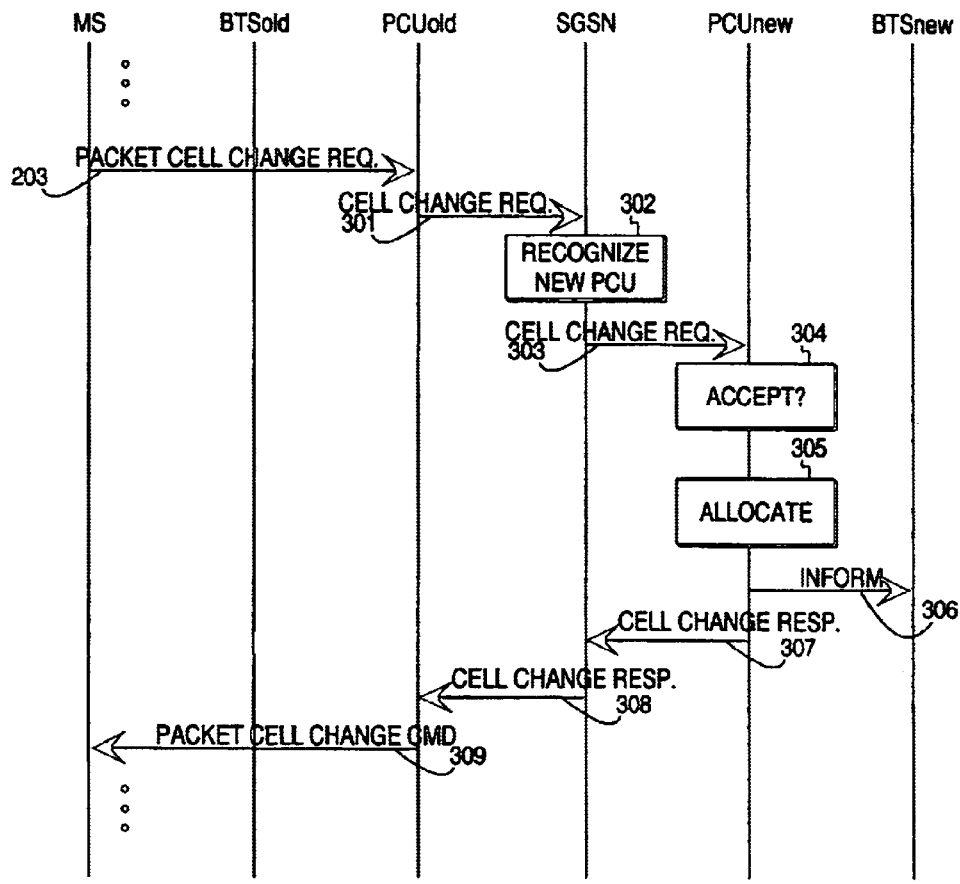
FIG. 3 illustrates a method according to a second embodiment of the invention.

Next we will consider a method according to a second embodiment of the invention which is illustrated in FIG. 3. This embodiment is the method for performing a cell change between different PCUs but within the coverage of a single SGSN, i.e. an inter-PCU inter-SGSN cell change. The initial normal transmission of data and the periodic transmission of quality reports are identical to those shown in FIG. 2, so they are not separately shown in FIG. 3. After having received the PACKET_CELL_CHANGE_REQUEST message 203 from the mobile station the old PCU transmits to the SGSN a corresponding message 301, an exemplary form of which is shown in FIG. 5c as the message 520. The fields of the message are the identifier of the old PCU 521, the identifier of the requested new cell 522, an optional descriptor of the mobile station's radio capability 523, an optional descriptor of the service type in the old cell 524 and a routing area code or RAC 525.

Upon receipt of the cell change request message 301 the SGSN derives the identity of the PCU controlling the target cell from the identifier of the target cell at step 302. The SGSN sends the cell change request message 303 to the new PCU in either an unchanged form or in a form comprising at least the fields similar to fields 521, 522, 523 and 524 of FIG. 5c. Upon receipt of this message the new PCU checks at step 304 whether it can accept the cell change request or not. In a negative case a rejection is sent back to the SGSN and forwarded from there to the old PCU; such action is straightforward to implement and is therefore not shown in FIG. 3. If the new PCU accepts the proposed cell change it allocates radio resources from the target cell at step 305 as described above in the context of an intra-PCU cell change; the message 306 to the new base station is similar to that described above. At step 307 the new PCU sends a CELL_CHANGE_RESPONSE message to the SGSN. An exemplary form of this message is shown in FIG. 5d as message 530 comprising the identifier of the old PCU 531, a fully encoded PACKET_CELL_CHANGE_CMD message 532, an optional mobile station reference 533 and a cause field 534. Instead of a completely encoded cell change message 532 the message 530 may also contain the relevant parameters to be included into the actual packet cell change command message to be sent to the mobile terminal. In that case the latter message is then produced and encoded by the old PCU.

Upon receipt of the cell change response message 307 the SGSN forwards it as its cell change response message 308 to the old PCU. Upon receipt of the message 308 the old PCU sends the actual PACKET_CELL_CHANGE_CMD message 309 to the mobile station, preferably on the PACCH as mentioned in association with the first embodiment of the invention. From there on the operation follows the first embodiment of the invention described above up to the point where the allocated resources should be released from the old base station.

It is possible that the TLLI or temporary logical link identifier of a connection changes when the connection is subjected to an inter-PCU intra-SGSN cell change. Such a situation may follow when the change of PCU is associated with a change of routing area. If that is the case, it is on the responsibility of the SGSN to issue the new TLLI. Most advantageously the SGSN arranges for the communication of the new TLLI to the mobile station through the messages 308 and 309 described above.

Because the old and new PCUs are different, the old PCU does not automatically know whether or not the access of the mobile station to the new cell has been successful and in the case of successful access when are the allocated resources at the old base station not needed any more. It is therefore not obvious how the old PCU should make the decision about releasing the allocated resources from the old base station. There are basically two alternative solution principles. According to the first principle the old PCU waits for a certain period of time from a fixed triggering event, e.g. the transmission of the cell change command message to the mobile station, before releasing the allocated resources from the old cell. We may say that the old PCU continues scheduling the mobile station for said certain period of time. A suitable time limit to be implemented with a countdown timer from the transmission of the cell change command message could be in the order of seconds, like five seconds. If the mobile station is found to be using the old base station at the expiry of the countdown timer, the old PCU deduces that the cell change was not successful and does not release the allocated resources at all. The expiry of a timer or a frame counter can also be related to a finding that the connection to the mobile station has been lost: after sending for example eight radio blocks to the mobile station without getting an answer the old PCU my deduce that the mobile station is not responding any more so that the allocated resources may be released.

The timer/frame counter alternative outlined above has the disadvantage that it wastes some resources at the radio interface. If the mobile station succeeded in rapidly accessing the new cell, the old PCU will keep the resources allocated from the old base station for no reason. Additionally the old PCU may even make unnecessary transmissions through the old base station, trying to get an answer from a mobile station which has already changed cells and thus causing unnecessary interference to all other radio connections nearby. Thereby also the second solution principle should be considered. In accordance therewith the new PCU informs the old PCU about a successful cell change, after which the old PCU immediately releases the radio resources from the old cell. The disadvantage of the second principle is that it requires additional network signalling between PCUs. A mixed solution may also be applied in which the old PCU waits for a certain counter to expire before releasing the old allocations, unless it receives a signalling message from the new PCU indicating that the cell change was successful. In the latter case the old PCU releases the old allocations as soon as it has received and decoded the message from the new PCU.

If there will be a transmission of signalling information from the old PCU to the new PCU it may be used to inform the new PCU about some transmission parameters and their values which were applied in the old PCU. For example the acknowledging parameters applied in the RLC protocol layer could be exported to the new PCU this way so that they need not be re-negotiated between the mobile station and the new PCU.

An advantageous point of time for performing an inter-PCU cell change is between two consecutive PDUs or protocol data units belonging to the LLC protocol level. Such timing of the cell change may obviate the need for transmitting transmission parameters and their values from the old PCU to the new PCU which was mentioned above.

The mixed solution allows for different kinds of PCUs to operate in the same network. Those new PCUs that are capable of sending cell change confirmations to old PCUs do so, whereby the unnecessary resource allocations and transmissions are minimized, but in the absence of such cell change confirmations all old PCUs apply the timer/frame counter procedure to ensure releasing of resources if the new PCU is not cooperative in this sense. An old PCU which does not recognize cell change confirmations simply ignores them and uses the timer/frame counter procedure in every case.

Figure 4:
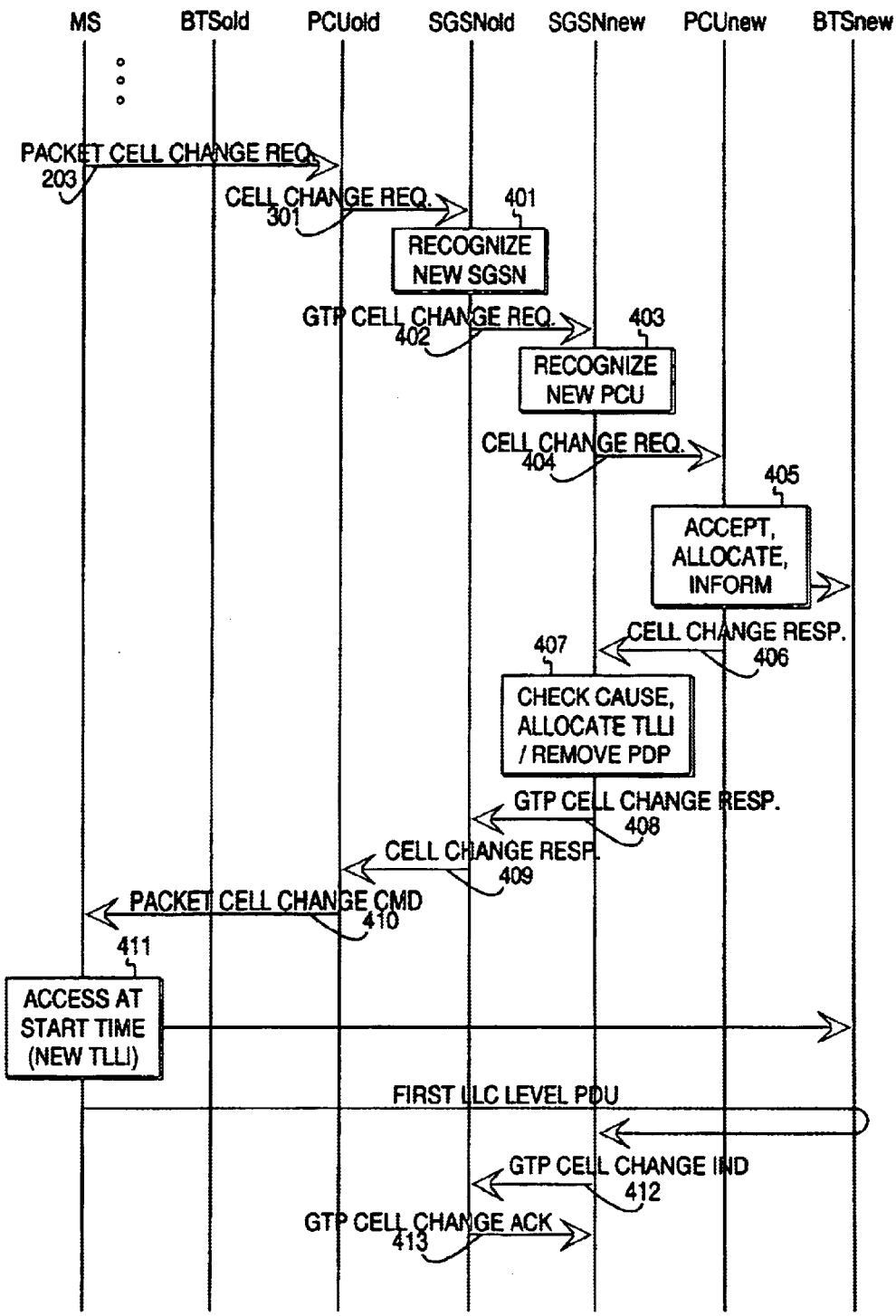

Next we will consider a method according to a third embodiment of the invention which is illustrated in FIG. 4.

Figure 5E:
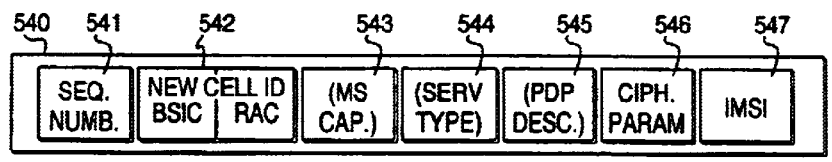

This embodiment is the method for performing a cell change between different PCUs that operate within the coverage of different SGSNs, i.e. an inter-PCU inter-SGSN cell change. The initial normal transmission of data and the periodic transmission of quality reports are identical to those shown in FIG. 2, so they are not separately shown in FIG. 4. After having received the PACKET_CELL_CHANGE_REQUEST message 203 from the mobile station the old PCU transmits to the old SGSN a corresponding message which is similar to message 301 in FIG. 3. At step 401 the old SGSN derives the address of the new SGSN controlling the target cell through the new PCU from the cell identifier (e.g. RAC) included in the cell change request message. At step 402 the old SGSN sends to the new SGSN a (GTP) CELL_CHANGE_REQUEST message, an exemplary form of which is shown in FIG. 5e. The message 540 comprises a sequence number 541, the identifier of the new cell 542, an optional descriptor of the mobile station's radio capabilities 543, an optional descriptor of the service type in the old cell 544, an optional descriptor of the PDP context(s) 545, a ciphering parameters field 546 and the IMSI (International Mobile Subscriber Identity) 547 related to the mobile terminal. Optionally the (GTP) CELL CHANGE REQUEST message may include the CELL CHANGE REQUEST message as such.

Upon receipt of the (GTP) CELL CHANGE REQUEST message the new SGSN derives at step 403 the new PCU or the PCU controlling the target cell from the cell identifier. Tile SGSNnew sends the CELL CHANGE REQUEST message 404, similar to the message 303 in FIG. 3, to the new PCU.

Upon receipt of the CELL CHANGE REQUEST message 404 the new PCU acts at step 405 as described above in association with the inter-PCU intra-SGSN cell change. Step 405 comprises thus all the mentioned acceptability checks and allocations as well as informing the new base station. At step 406 the new PCU sends its CELL CHANGE RESPONSE message to the new SGSN. This message is advantageously identical to message 307 in FIG. 3.

Figure 5F:
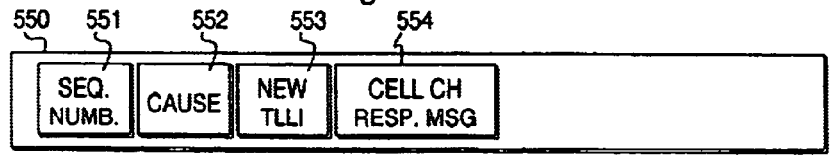

Upon receipt of the CELL CHANGE RESPONSE message 406 the new SGSN checks at step 407 the cause parameter contained in said message. If the outcome of the operation is positive, the new SGSN keeps the PDP context info if provided by the old SGSN and allocates a new TLLI (Temporary Logical Link Identifier) for the mobile station. Otherwise the new SGSN removes at step 407 the PDP context info (if even provided by the SGSNold). At step 408 the new SGSN sends the (GTP) CELL CHANGE RESPONSE message to the old SGSN. An exemplary form of the message is shown in FIG. 5f where the fields of the message 550 are sequence number 551, cause 552, new TLLI 553, and the original CELL CHANGE RESPONSE message 554.

Upon receipt of tie (GTP) CELL CHANGE RESPONSE message the old SGSNold sends at step 409 the CELL CHANGE RESPONSE message contained within it to the old PCU. Upon receipt of the CELL CHANGE RESPONSE message the old PCU sends the actual PACKET_CELL_CHANGE_CMD message 410 to the mobile station, preferably on the PACCH as mentioned in association with the first embodiment of the invention.

Upon receipt of the PACKET CELL CHANGE CMD message the mobile station acts at step 411 as described in association with the inter-PCU intra-SGSN cell change with the following exception: when accessing the new cell, the mobile station uses the new TLLI when applicable, and in case the cell change is unsuccessful and the mobile station returns to the old cell, the mobile station uses its old TLLI when applicable.

When the new SGSN has received the first PDU of the LLC level from the mobile station (including the new TLLI), it should notify the old SGSN (and HLR) of the successful cell change. The new SGSN sends at step 412 the (GTP) CELL CHANGE IND message to the old SGSN. The new SGSN also updates any affected GGSNs in a manner known as such. Thereafter all data packets are routed via the new SGSN.

Upon receipt of the (GTP) CELL CHANGE IND message the old SGSN start a timer and sends a (GTP) CELL CHANGE ACK message 413 to the new SGSN. If the old SGSN holds unsent (unacknowledged) downlink data packets for the mobile station, the old SGSN forwards the data packets to the new SGSN. While the timer is running the old SGSN forwards all data packets received for the mobile station to the new SGSN. Upon expiry of the timer, the old SGSN shall delete information related to tie mobile station.

As an option, the old SGSN may forward a copy of all otherwise unacknowledged downlink data packets to the new SGSN already after sending the (GTP) CELL CHANGE REQUEST message. Thus when the MS accesses the new cell, the MS is able to receive data packets immediately.

The above-presented embodiments of the invention are naturally only exemplary and numerous additions and modifications thereto are possible without departing from the scope of the appended claims. For example in such cell changes where communication with SGSN is not needed but two PCUs are involved, e.g. in an inter-PCU intra-SGSN cell change, the old PCU might send the cell change request message directly to the new PCU and not through the SGSN, taken that the old PCU is able to derive the identity of the new PCU from e.g. the identifier of the requested new cell in the message from the mobile station. The old PCU may even poll several candidate new PCUs and proceed with only the selected new PCU. Another addition and modification is the use of transmission frame synchronization between cells, which may obviate the need for separate random access bursts: the access to the new cell could take place directly by using the allocated radio resources. The mobile station may announce several candidates for new cells in its request message; these candidate cells may affect the network-side action so that several request messages to even different SGSNs and PCUs are sent simultaneously. The invention is not sensitive to whether the updating of the mobile station's location at the GGSN level is performed by the old or the new SGSN.

The invention is also not limited by the above-given GPRS-related denominations of the network elements and messages, although they serve to emphasize the applicability of the invention in the context of the GPRS. The invention is also applicable to other packet-switched cellular radio systems.

What is claimed is:

1. A method for implementing a cell change for a mobile station in a packet-switched cellular radio system comprising a first base station, a second base station and a controlling unit controlling the operation of at least the first base station, comprising the steps of:

establishing at the controlling unit knowledge about the mobile station's need for performing a cell change from the cell of the first base station to the cell of the second base station while the mobile station is still communicating with the first base station, transmitting from the controlling unit towards the mobile station through the first base station a first message in order to fix an oncoming first moment of time as the moment of performing cell change, said first moment of time being indicated in said first message by a frame number, and from said first moment of time onwards providing access for the mobile station to the cell of the second base station.

2. A method according to claim 1, wherein the step of establishing at the controlling unit knowledge about the mobile station's need for performing a cell change takes place as a response to the reception at the controlling unit of a request message from the mobile station, said request message indicating the mobile station's willingness to perform a cell change.

3. A method according to claim 1, additionally comprising the step of receiving at the controlling unit quality reports from the mobile station, so that the step of establishing at the controlling unit knowledge about the mobile station's need for performing a cell change takes place as a response to an observation based on the received quality reports and indicating the need for performing a cell change for the mobile station.

4. A method according to claim 1, wherein, in an arrangement where the controlling unit additionally controls the operation of the second base station, the step of establishing at the controlling unit knowledge about the mobile station's need for performing a cell change is followed by a step of allocating at the controlling unit a certain amount of radio resources for the mobile station at the second base station.

5. A method according to claim 4, comprising the steps of:
allocating by the controlling unit a certain amount of radio resources for the mobile station at the second station, said certain amount of radio resources corresponding to the needs of a full data transmission connection between the mobile station and the packet-switched cellular radio system,
allocating by the controlling unit a certain amount of radio resources at the second base station for transmitting timing advance information to the mobile station,
responding to the mobile station's access to the cell of the second base station by providing said timing advance information to the mobile station and
immediately thereafter commencing the utilization of a full data transmission connection between the mobile station and the packet-switched cellular radio system through the second base station.

6. A method according to claim 4, comprising the steps of:
allocating by the controlling unit a certain amount of radio resources for the mobile station at the second base station, said certain amount of radio resources for the mobile station at the second base station, said larger amount of radio resources corresponding to a connection of limited capacity between the mobile station and the controlling unit,
responding to the mobile station's access to the cell of the second base station by allocating by the controlling unit a certain larger amount of radio resources for the mobile station at the second base station, said larger amount of radio resources corresponding to the needs of a full data transmission connection between the mobile station and the packet-switched cellular radio system,
providing timing advance information concerning the mobile station to the second base station and from there to the mobile station and
commencing the utilization of a full data transmission connection between the mobile station and the packet-switched cellular radio system through the second base station.

7. A method according to claim 1, wherein, in an arrangement where the controlling unit is a first controlling unit that controls the operation of the first base station and the packet-switched cellular network additionally comprises
a second controlling unit that controls the operation of the second base station and
a routing and location information maintaining unit with a domain that comprises both the first controlling unit and the second controlling unit;
the step of establishing at the controlling unit the knowledge about the mobile station's need for performing a cell change is followed by the steps of:
transmitting a first cell change request from the first controlling unit to the routing and location information maintaining unit,
transmitting a second cell change request corresponding to said first cell change request from the routing and location information maintaining unit to the second controlling unit and
allocating at the second controlling unit a certain amount of radio resources for the mobile station at the second base station.

8. A method according to claim 7, comprising the steps of:
as a response to the reception of said second cell change request, allocating by the second controlling unit a certain amount of radio resources for the mobile station at the second base station, said certain amount of radio resources corresponding to the needs of a full data transmission connection between the mobile station and the packet-switched cellular radio system,
allocating by the second controlling unit a certain amount of radio resources at the second base station for transmitting timing advance information to the mobile station,
responding to the mobile station's access to the cell of the second base station by providing said timing advance information to the mobile station and
immediately thereafter commencing the utilization of a full data transmission connection between the mobile station and the packet-switched cellular radio system through the second base station.

9. A method according to claim 7, comprising the steps of:
as a response to the reception of said second cell change request, allocating by the second controlling unit a certain amount of radio resources for the mobile station at the second base station, said certain amount of radio resources corresponding to a connection of limited capacity between the mobile station and the second controlling unit,
responding to the mobile station's access to the cell of the second base station by allocating by the second controlling unit a certain larger amount of radio resources for the mobile station at the second base station, said larger amount of radio resources corresponding to the needs of a full data transmission connection between the mobile station and the packet-switched cellular radio system,
providing timing advance information concerning the mobile station to the second base station and from there to the mobile station and
commencing the utilization of a full data transmission connection between the mobile station and the packet-switched cellular radio system through the second base station.

10. A method according to claim 1, wherein, in an arrangement where the controlling unit is a first controlling unit that controls the operation of the first base station and the packet-switched cellular network additionally comprises a second controlling unit that controls the operation of the second base station, a first routing and location information maintaining unit with a domain that comprises the first controlling unit and a second routing and location information maintaining unit with a domain that comprises the second controlling unit; the step of establishing at the controlling unit the knowledge about the mobile station's need for performing a cell change is followed by the steps of:

transmitting a first cell change request from the first controlling unit to the first routing and location information maintaining unit, transmitting a network-level cell change request corresponding to said first cell change request from the first routing and location information maintaining unit to the second routing and location information maintaining unit, transmitting a second cell change request corresponding to said network-level cell change request from the second routing and location information maintaining unit to the second controlling unit and allocating at the second controlling unit a certain amount of radio resources for the mobile station at the second base station.

11. A method according to claim 1, wherein the step of transmitting from the controlling unit towards the mobile station through the first base station a first message in order to fix an oncoming first moment of time is accomplished by commanding by said first message the initialization of a certain countdown timer in the mobile station.

12. A method according to claim 1, comprising the step of maintaining a radio resource allocation for the mobile station at the first base station for a certain time after said first moment of time.

13. A method according to claim 12, comprising the step of maintaining a radio resource allocation for the mobile station at the first base station until the expiry of a certain predefined time limit after said first moment of time.

14. A method according to claim 12, comprising the step of maintaining a radio resource allocation for the mobile station at the first base station until the controlling unit finds out that the mobile station has successfully changed to the cell of the second base station.

15. A method according to claim 14, wherein, in an arrangement where the controlling unit additionally controls the operation of the second base station, the step of finding out by the controlling unit that the mobile station has successfully changed to the cell of the second base station is accomplished by observing at the controlling unit that bursts related to normal transmission of data between the mobile station and the packet-switched cellular radio system are flowing through the new base station.

16. A method according to claim 14, wherein, in an arrangement where the controlling unit is a first controlling unit that controls the operation of the first base station and the packet-switched cellular network additionally comprises a second controlling unit that controls the operation of the second base station, the step of finding out by the first controlling unit that the mobile station has successfully changed to the cell of the second base station is accomplished by receiving at the first controlling unit a message from the second controlling unit.

17. A method according to claim 12, comprising the step of maintaining a radio resource allocation for the mobile station at the first base station either until the expiry of a certain predefined time limit after said first moment of time or until the controlling unit finds out that the mobile station has successfully changed to the cell of the second base station, whichever of these events comes first.

18. A method for implementing a cell change in a mobile station of a packet-switched cellular radio system, comprises the steps of:

receiving a message from a controlling unit of the packet-switched cellular radio system through a first base station, after the reception of said message, continuing the utilization of an existing packet-switched communication connection with the first base station until a certain first moment of time defined in said message as the moment of performing cell change, the definition of said first moment of time indicated by said message being selected from the group of: a frame number coinciding in time with said first moment of time, the time when the mobile station receives said first message, and a predetermined delay in relation to the time when the mobile station receives said first message, and from said first moment of time onwards accessing the cell of a second base station.

19. An arrangement for implementing a cell change for a mobile station in a packet-switched cellular radio system comprising a first base station, a second base station and a controlling unit for controlling the operation of at least the first base station, comprising:

in the controlling unit means for establishing at the controlling unit the knowledge about the mobile station's need for performing a cell change from the cell of the first base station to the cell of the second base station while the mobile station is still communicating with the first base station, in the controlling unit and the first base station means for transmitting towards the mobile station through the first base station a first message in order to fix an oncoming first moment of time as the moment of performing cell change, an indication of said first moment of time by said first message being selected from the group of: a frame number coinciding in time with said first moment of time, the time when the mobile station receives said first message, and a predetermined delay in relation to the time when the mobile station receives said first message, and in the second base station means for from said first moment of time onwards providing access for the mobile station to the cell of the second base station.

20. A method for implementing a cell change for a mobile station in a packet-switched cellular radio system comprising a first base station, a second base station and a controlling unit controlling the operation of at least the first base station, comprising the steps of:

establishing at the controlling unit knowledge about the mobile station's need for performing a cell change from the cell of the first base station to the cell of the second base station while the mobile station is still communicating with the first base station, transmitting from the controlling unit towards the mobile station through the first base station a first message in order to fix an oncoming first moment of time as the moment of performing cell change, an indication of said first moment of time by said first message being selected from the group of the time when the mobile station receives said first message and a predefined delay in relation to said time of the receipt of said first message, and from said first moment of time onwards providing access for the mobile station to the cell of the second base station.

* * * * *